United States Patent [19]

Stuebbe

[11] Patent Number: 5,842,523
[45] Date of Patent: Dec. 1, 1998

[54] AMBULATION-PROTECTION MEANS FOR EQUINE HOOFS

[76] Inventor: Peter Stuebbe, Zum Schelland 44c, 32602 Vlotho, Germany

[21] Appl. No.: 750,047
[22] PCT Filed: May 31, 1995
[86] PCT No.: PCT/EP95/02070
    § 371 Date: Dec. 23, 1996
    § 102(e) Date: Dec. 23, 1996
[87] PCT Pub. No.: WO95/32619
    PCT Pub. Date: Dec. 7, 1995
[51] Int. Cl.$^6$ .................................................. A01L 5/00
[52] U.S. Cl. ................................... 168/4; 168/DIG. 1
[58] Field of Search ........................... 168/4, 12, 17, 168/20, DIG. 1

[56] References Cited

U.S. PATENT DOCUMENTS 3,476,190  11/1969  Jenny et al. ................. 168/DIG. 1 X
4,892,150  1/1990   Thoman ................................ 168/4

FOREIGN PATENT DOCUMENTS 308722   3/1989  European Pat. Off. ............. 168/4
3721856  6/1988  Germany .............................. 168/4
1107    of 1884  United Kingdom ................ 186/20

*Primary Examiner*—Robert P. Swiatek
*Attorney, Agent, or Firm*—Walter C. Farley

[57] ABSTRACT

An ambulation-protection structure for equine hoof including a layer of plastic affixed the outside surface of the hoof's horn wall. The plastic layer is made of a material of several mixed components and hardens in a rigid, dimensionally stable manner on the surface to which it is firmly affixed, this layer, which is 2 to 20 mm thick, running at least over the front half of the periphery of the outside surface of the hoof.

10 Claims, 4 Drawing Sheets

AMBULATION-PROTECTION MEANS FOR EQUINE HOOFS

FIELD OF THE INVENTION

The invention concerns ambulation-protection means of including a plastic layer formed on the hoof and forming a customized shoe for the hoof.

BACKGROUND OF THE INVENTION

In known designs of this general type, a plastic layer is a component of a fastening system for a plastic sole mounted underneath the hoof sole, said plastic sole being fitted with upward projecting deposits present at the edge. The plastic layer is composed of resilient plastic which does not evince rigid dimensional stability and which is bonded to the outside of the horn wall by a bonding layer consisting, for instance, of instant glue or of hot-melt adhesive as described in German patent document 38 32 705 C2.

It is further known from the state of the art to use a plastic in the form of a mixture of several components which cures directly on the hoof's horn and which hardens in rigid dimensionally stable manner. In the state of the art this material is used to repair damaged hoofs. Reference is hereby made to the product Grand Circuit Acrylic Hoof Repair Systems Across-the-Anvil-East Co., Anvil, USA and further to the product Equilox Innovative Animal Products Co.

Rochester USA.

These polymethacrylate-based materials display the property of curing on the hoof horn in tight and rigid, dimensionally-stable manner into a hardness approximating that of the horn. In the state of the art, these materials are used to repair the horn, for instance to fill missing horn fragments. Together with the horn, this material will form a homogeneous unit and together with it may be worked, for instance by rasping or cutting, or it can be nailed etc.

In accordance with this invention, this material is used to provide ambulation-protection means for equine hoofs to achieve properties which are both outstanding and heretofore unknown in the state of the art.

Coating the outside of the horn wall, in the form of a corset-outer reinforcement, with this material heretofore used only for repairs, results in reinforcing the hoof against high-load, strong deformations. Excessive hoof widening under such loads is prevented. Moreover the layer protects against point-loads on the hoof, for instance when stepping on a sharp stone, and prevents localized fragmentation in hoof parts. Also the layer allows making the hoof more abrasion-proof, provided that the lower edge of the coat is part of the hoof's ground contact-making surface or when used to hold a sole borne under the hoof.

A thick layer in this zone is preferred and results in substantially improved hoof strength.

The layer is able to grow downward together with the hoof, and may be shortened by abrasion on the ground or by paring the ambulation-protection means to restore the required original hoof shape, while retaining nevertheless the required thickness. Accordingly, a new coat will be required only after prolonged ambulation when the hoof's horn wall has grown downward essentially beyond the height of the initially deposited layer.

Such a layer embodiment divided into segments only trivially reduces its stability of affixation and rupture resistance imparted to the hoof while offering the advantage of a contoured external hoof shape assuring improved grip on the ground or advantageously assures peripheral geometric locking of a sole borne on the coating.

Such a layer of abrasion-proof material extending as far as the ground and at least partly constituting the hoof's ground contact-making surface effectively reduces abrasion of the horn material of the hoof and thereby secures the hoof proper against undue wear even at high ambulation loads. Even though lacking hoof protection by an iron or by a plastic sole, the horse is left with a substantially natural feeling for ambulation, that is with a free sole, when under high ambulation load.

Alternatively a layer implementing geometrical locking with a plastic sole under the hoof may be provided, the geometric lock advantageously being detachable. In this manner a hoof-protecting sole can be kept simply and effectively on the hoof.

Engagement between the plastic sole and elevations are advantageous and create excellent irrotationality of the sole relative to the hoof on account of the peripheral geometrical locking between the elevations of the plastic sole and the layer segments, and as a result the feared phenomenon of the sole being torn off due to rotation of the resting hoof will be prevented.

Advantageously, the layer itself may be an integral plastic sole running under the hoof sole, whereby a high-resistant design is created, allowing especially simple mounting to the hoof and providing especially effective hoof protection.

This design comprising imbedded metal pins is applicable to all the above embodiments of the invention and said metal pins increase abrasion resistance and a good grip on the ground trod by the horse.

Forming a very thick layer makes it possible furthermore to use the layer affixing a conventional horseshoe by nailing into this layer. Thereby the horse may be shod conventionally without fear of damaging the hoof by nailing.

BRIEF DESCRIPTION OF THE DRAWINGS

The invention is elucidated in illustrative and schematic form in the drawings.

DESCRIPTION OF PREDFERRED EMBODIMENTS

Figure 1:
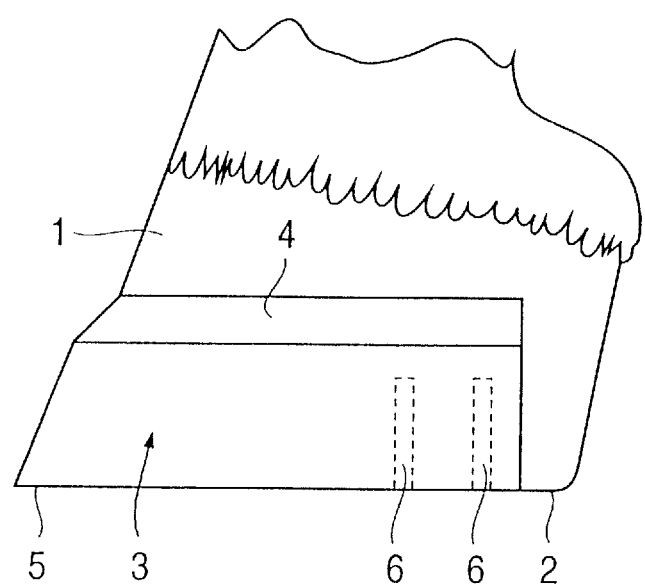
FIG. 1 is a side view of an equine hoof with a first embodiment of the ambulation-protection means of the invention.
Figure 2:
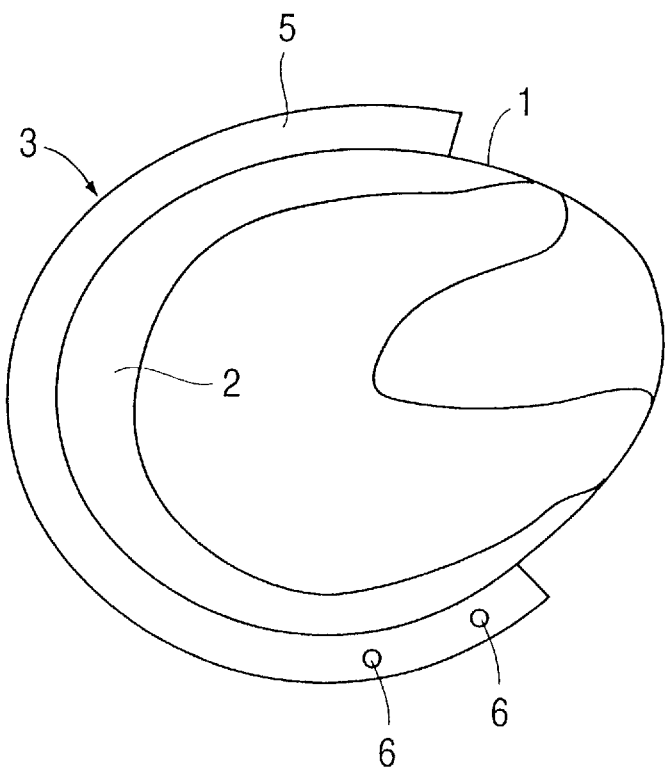
FIG. 2 is the design of FIG. 1 seen from below.

FIGS. 1 and 2 resp. are a side view and a view from below of an equine-hoof sole with the outside surface 1 of the horn wall and the horn wall's sole edge 2 shown in FIG. 2. The ambulation protection means shown is composed of a plastic layer 3 that was mixed from two or more components in liquid form and deposited by a casting mold not shown onto the outside surface 1, and curing with intense adhesion on account of its chemical properties and in the hardened state being rigidly dimensionally stable, further evincing material properties akin to that of the natural hoof horn.

Illustratively such materials are available in the form of polymethacrylate based substances. For instance they are commercially available under the Trademark EQUILOX made by Innovative Animal Products in Rochester USA or as Grand Circuit Acrylic Hoof Repair Systems by Across the Anvil East at Anvil, USA. These materials have been found practical for repairs, that is to fill holes and cracks in a damaged hoof.

As shown in FIGS. 1 and 2, in the first embodiment of the ambulation-protection means of the invention, the layer 3 is mounted essentially on the periphery of the outside surface 1 of the horn wall as a continuous coating or layer. The layer height in this embodiment extends upwardly for about two-thirds of the height of the outside surface 1 and is shaped at its upper edge with a bevel 4 to prevent, for example, the hoofs from catching on each other if they touch. The lower edge 5 of the layer 3 in this embodiment is flush with the sole edge 2 of the hoof's horn wall and together with it provides an expanded horseshoe-shaped hoof ground-contacting surface.

The layer thickness is approximately 4 to 10 mm and therefore is of the order of magnitude of the width of the sole edge 2.

In the embodiment of FIGS. 1 and 2, the material of the layer 3 illustratively is made abrasion-proof by using appropriate additives, the abrasion resistance preferably being of the order of magnitude of that of the hoof's horn material at the sole edge 2.

When the horse walks or runs while shod with the ambulation protection means shown in FIGS. 1 and 2, then the abrasion load will be spread over the sole edge 2 and onto the lower edge 5 of the layer 3. If preferably the layer 3 is made somewhat more abrasion-proof than the hoof's horn material, then, when high abrasion stresses are encountered, for instance at high moving speeds by the horse on firm ground, excessive wear of the sole edge 2 is avoided. Accordingly, the horse can go fast or far with such an ambulation protection means without incurring excessive hoof wear, and without requiring sole protection in the form of a foreign material underneath the hoof sole. Therefore the horse can move on a substantially natural hoof that will not excessively wear.

Moreover, the layer 3 imparts protection to the hoof against excessive point loads, for instance when stepping on a sharp stone. Thereby point-fragmentation and loss of fragments from the sole edge 2 are precluded. Furthermore excessive hoof widening and hence hoof damage in the presence of high ground contact-surface loading is averted.

As shown by FIGS. 1 and 2, metal pins or studs 6 may be imbedded in the layer 3 and may project from the lower edge 5 of the layer 3, that is from the ground-contacting surface, or, as shown, they may terminate flush with said layer. The metal pins 6 improve abrasion resistance and may provide an anti-skidding effect on slippery surfaces.

Figure 3:
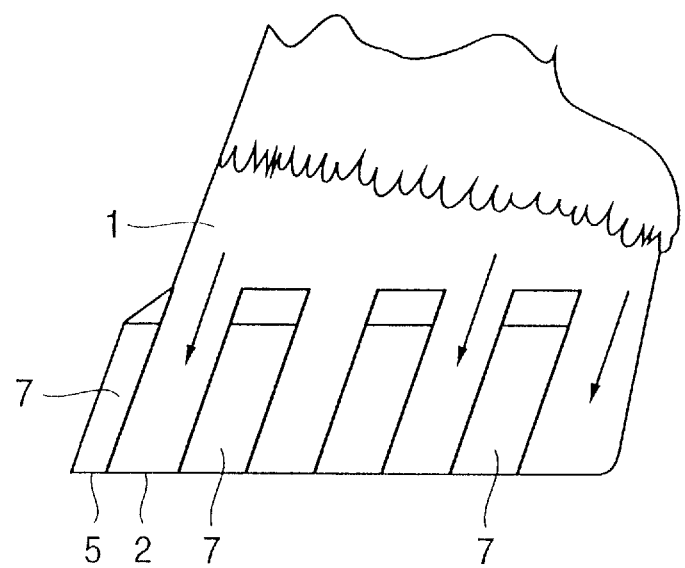
FIG. 3 is a view similar to that of FIG. 1 for a second embodiment.
Figure 4:
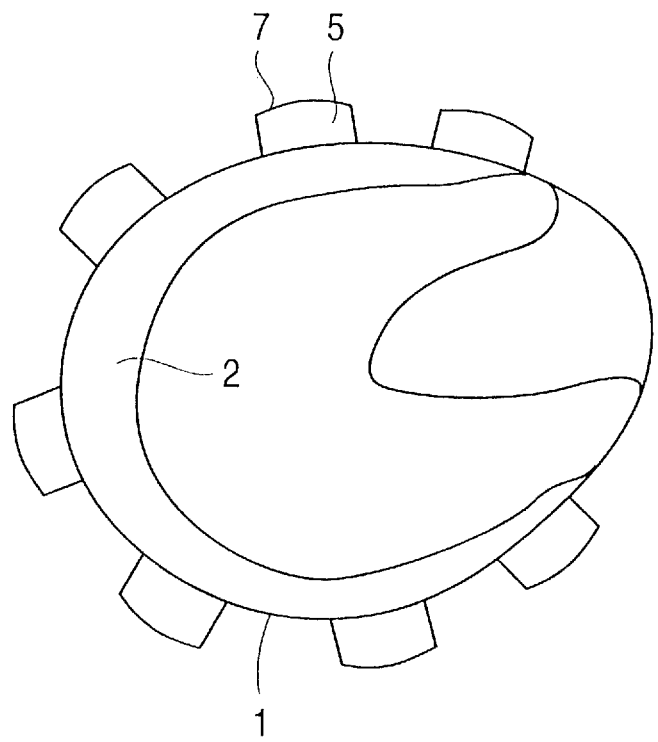
FIG. 4 is the embodiment of FIG. 3 seen from below.

FIGS. 3 and 4 are views similar to those of FIGS. 1 and 2 and show a variation of the above embodiment wherein the same material is used, and in the same layer thickness, as in the embodiments of FIGS. 1 and 2, in the coating of the outer surface 1 of the horn wall, however in this case in the form of peripherally spaced segments 7 running over the height of the horn wall 3. Again the segments 7 impart by their lower edges 5 a wear-reducing enlargement of the hoof ground-contacting surface and are used to provide abrasion resistance to the sole wall 2. Because the segments 7 entail a peripherally contoured edge of the resulting hoof contact surface with the ground, the horse is assured of anti-skid stepping on soft ground. Also, segments 7 result in rigidifying the horn wall and in preventing local fragmentation of the horn wall when point-loaded similarly to the case for the layer 3 of the embodiments of FIGS. 1 and 2.

Figure 5:
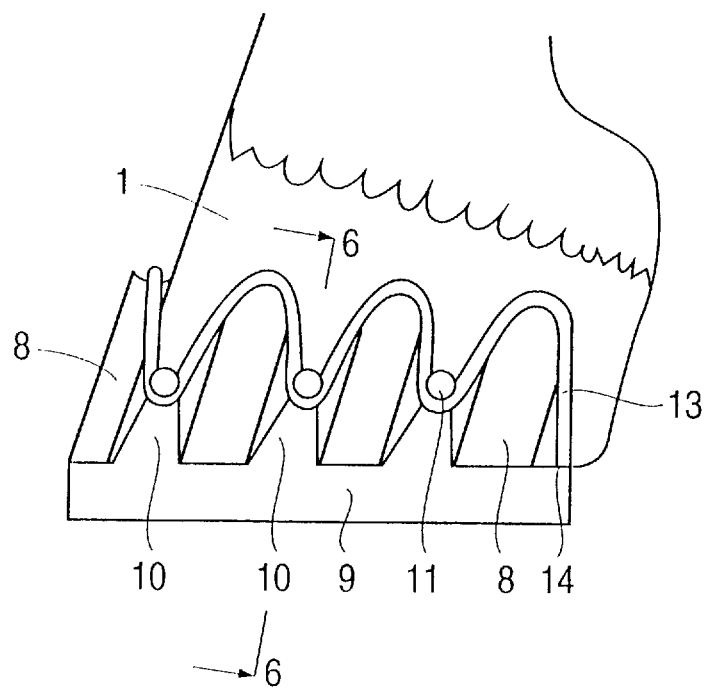
FIG. 5 is a view similar to FIG. 1 of a third embodiment.
Figure 6:
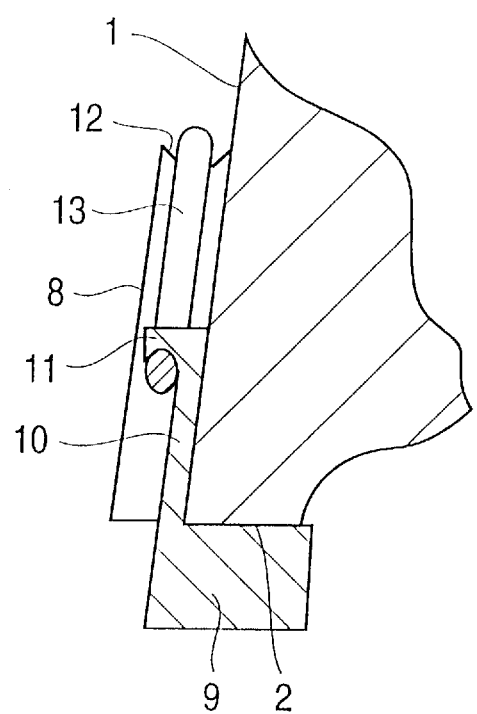
FIG. 6 is a section along line 6—6 of FIG. 5.

FIGS. 5 and 6 show another embodiment comprising segments 8 similar to the segments 7 of the embodiment of FIGS. 3 and 4. Segments 8 again impart the desired rigidification of the hoof against excessive loads and against localized fragments breaking off due to point loading, but in this embodiment the segments essentially serve to keep in place a plastic sole 9 made of an appropriate material and shaped like a horseshoe, under the hoof's sole edge 2, said sole 9 comprising elevations 10 by which it enters the gaps between the segments 8 and locks up geometrically with said gaps.

Outwardly projecting hooks 11 are present at the upper ends of the elevations 10. Channels 12 are formed at the upper edges of the elevations 8. As shown by FIGS. 5 and 6, a band 13 runs peripherally and alternatingly underneath the hooks 11 and over the channels 12, said band 13 being affixed by means, no means at its ends to the site 14 of the sole 9. The band 13 is sufficiently resilient in tension and, where called for, it may be made of a somewhat elastic material, and it vertically keeps sole 9 in geometrically locking manner against the segments 8, that is, to the hoof. Peripherally the geometrically locking action of the elevations 10 between the segments 8 assures irrotationality which prevents tearing off the sole 9 in the event the horse should turn dangerously.

Figure 7:
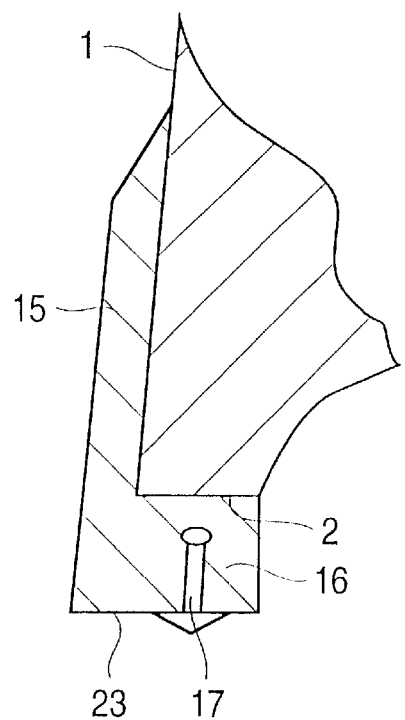
FIG. 7 is a section similar to FIG. 6 of a fourth embodiment.

FIG. 7 shows another embodiment wherein a layer 15 corresponding to the layer 3 of the embodiment of FIGS. 1 and 2 is cast onto the outer surface 1 of the horn wall. In this embodiment, layer 15 extends under the sole edge 2 where it forms a sole 16 integral with the layer 15.

In the embodiment shown in FIG. 7, metal studs 17 have been incorporated into the sole 16 and in this embodiment project beyond the sole's ground-contacting surface 23.

Figure 8:
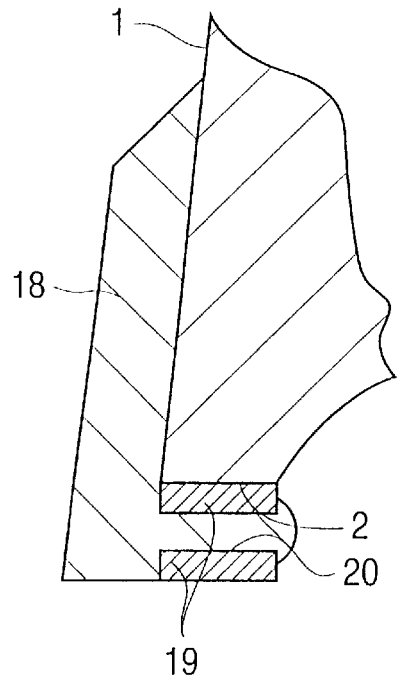
FIG. 8 is a section similar to FIG. 6 of a fifth embodiment.

FIG. 8 shows an embodiment similar to that of FIG. 7. In this design also a layer 18 runs under the hoof sole edge 2 where, however, it is cast in geometrically locking manner to join a separately mounted sole body 19. The sole body 19 comprises apertures 20 allowing the material of the layer 18 to flow through when being cast to assure reliable geometric connection, as indicated in FIG. 8. The material of the sole body 19 may be selected to be especially abrasion resistant, for instance being a suitable plastic, or even a metal.

Figure 9:
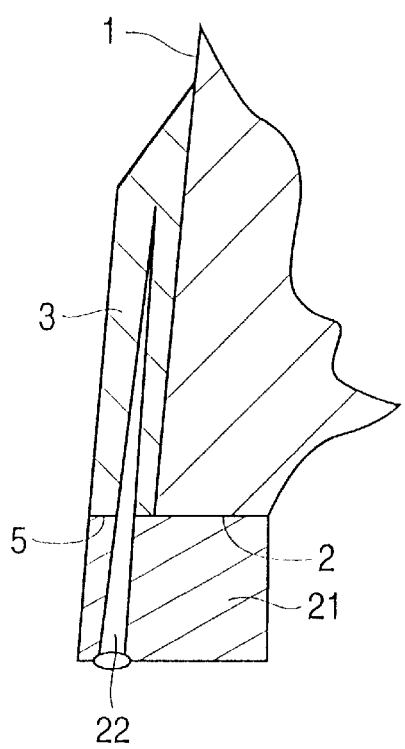
FIG. 9 is a section similar to FIG. 6 of a sixth embodiment of ambulation-protection means of the invention.

FIG. 9 shows an embodiment comprising the layer 3 of FIGS. 1 and 2, the material of the layer 3 in this case possibly being less abrasion-resistant. In this case a conventional metal horseshoe 21 is provided and has sufficient width to cover sole edge 2 and the lower edge 5 of layer 3. The horseshoe 21 is nailed using conventional horseshoe nails 22; however, contrary to the conventional case, the nails extend not into the hoof, but instead into the layer 3 as shown in FIG. 9. In this manner a conventional horseshoe may be used without any danger that the horse be injured.

Over long-term use of the shown embodiments of the ambulation protection means attention must be paid to the fact that the horse's horn wall gradually grows downward in the direction of the arrows indicated in FIG. 3. As regards a horse moving in a natural environment without ambulation protection means, that is a horse not exposed to excessive ambulation loads by a rider over long distances or hard ground, the abrasion at the sole edge 2 will be in equilibrium with the rate of growth in the direction of the arrows in FIG. 3. This equilibrium is furthermore retained in the embodiments of FIGS. 1 through 5 also for higher ambulation stresses, that is in the presence of higher abrasion. The layer 3, and the segments 7, gradually grow downward together with the horn wall and in the process are being abraded. New coating will be required only after a substantial time interval.

As regards the embodiment of FIGS. 5, 6 and 9, abrasion does not take place at the hoof-sole edge 2. Thus, the horn wall slowly and ultimately grows too far downward and must be pared back from time to time. For that purpose the sole 9 or the horseshoe 21 must be removed. The sole edge 2 will be pared and the sole 9 or the horseshoe 21 can be set back again. In this case also the coating must be renewed only after repeated paring, that is, new segments 8 or a new layer 3 must be deposited again.

As regards the embodiments of FIGS. 7 and 8 which are free of abrasion at the sole edge 2, this sole edge 2 must be periodically pared to restore the initial hoof shape. For that purpose the sole 16 underneath the sole edge 2 in FIG. 7 or the sole body 19 of FIG. 8 must be removed and, as long as the layer 15 or 18 is still present at an adequate height, it may be integrated by casting material again onto said layer 15 or 18.

Additional variations of the shown embodiments are possible. Illustratively the layer 3 of FIGS. 1 and 2 or the segments 7 of FIGS. 3 and 4 may evince a substantially lesser height. As a result the weight of the assembly is reduced. However, new casting will be required more frequently.

As regards the embodiment of FIGS. 5 and 6, the vertical geometric locking of sole 9 and segments 8 may be achieved also in a manner different from that shown, for instance by direct lateral tooth-meshing between the elevations 10 and the segments 8 or illustratively by other connections between the elevations 10 and the segments 7 such as by screw means, wedging and the like.

I claim:

1. An ambulation protection structure for an equine hoof comprising the combination of
    a segmented layer of plastic material formed on and adherable to an outer sidewall surface of the hoof, said layer being cured to a horn-like, dimensionally rigid form, said layer comprising peripherally spaced segments,
        said layer having a thickness of 2 to 20 mm and extendable peripherally over at least a front half of said outer surface;
    a sole comprising a bottom surface and a plurality of upwardly extending elevation members extending between said segments; and
    means for holding said elevation members between said segments, thereby forming a detachable geometric locking relationship inhibiting relative rotation between said sole and said segments.

2. A structure according to claim 1 and including metal pins embedded in said layer and extending at least to bottom surfaces thereof.

3. A method of forming an ambulation-protection means on an equine hoof having a bottom, ground-contacting surface and a peripheral exterior side wall, the method comprising the steps of
    providing a hardenable, plastic material,
    applying the hardenable material to the exterior side wall of the equine hoof to form a layer of material to a thickness of between 4 and 10 mm covering a majority of the surface area of said side wall without making openings into or through the hoof, and
    allowing the layer of material to harden to a substantially inelastic, horn-like hardness, thereby forming an ambulation-protection means on said hoof.

4. A method according to claim 3 wherein the step of applying includes applying the layer of hardenable material from the ground contact surface of the hoof to a height above the ground-contacting surface equal to about two thirds of the hoof height and comprises a bevel sloping inwardly toward the hoof at the upper edge of the layer.

5. A method according to claim 4 and including embedding metal pins in said layer of material as it is applied with the metal pins having lower ends at a bottom surface of the layer.

6. A method according to claim 4 wherein the step of applying includes applying the layer of hardenable material to the ground contacting surface of the hoof outwardly of the hoof center.

7. A method of forming an ambulation-protection means on an equine hoof having a bottom, ground-contacting surface and a peripheral exterior side wall, the method comprising the steps of
    providing a hardenable, plastic material,
    applying the hardenable material to the exterior side wall of the equine hoof to form an interrupted layer of material to a thickness of between 4 and 10 mm on the side wall, the interrupted layer comprising a sequence of segments with intervening spaces, and
    allowing the layer of material to harden, thereby forming an ambulation-protection means on said hoof.

8. A method according to claim 7 wherein the step of applying includes applying the layer of hardenable material from the ground contact surface of the hoof to a height above the ground-contacting surface equal to about two thirds of the hoof height and comprises a bevel sloping inwardly toward the hoof at the upper edge of the layer.

9. A method according to claim 8 and including embedding metal pins in said layer of material as it is applied with the metal pins having lower ends at a bottom surface of the layer.

10. A method according to claim 8 wherein the step of applying includes applying the layer of hardenable material to the ground contacting surface of the hoof outwardly of the hoof center.

\* \* \* \* \*